D. W. LONG.
Hinges.
No. 158,643.  Patented Jan. 12, 1875.
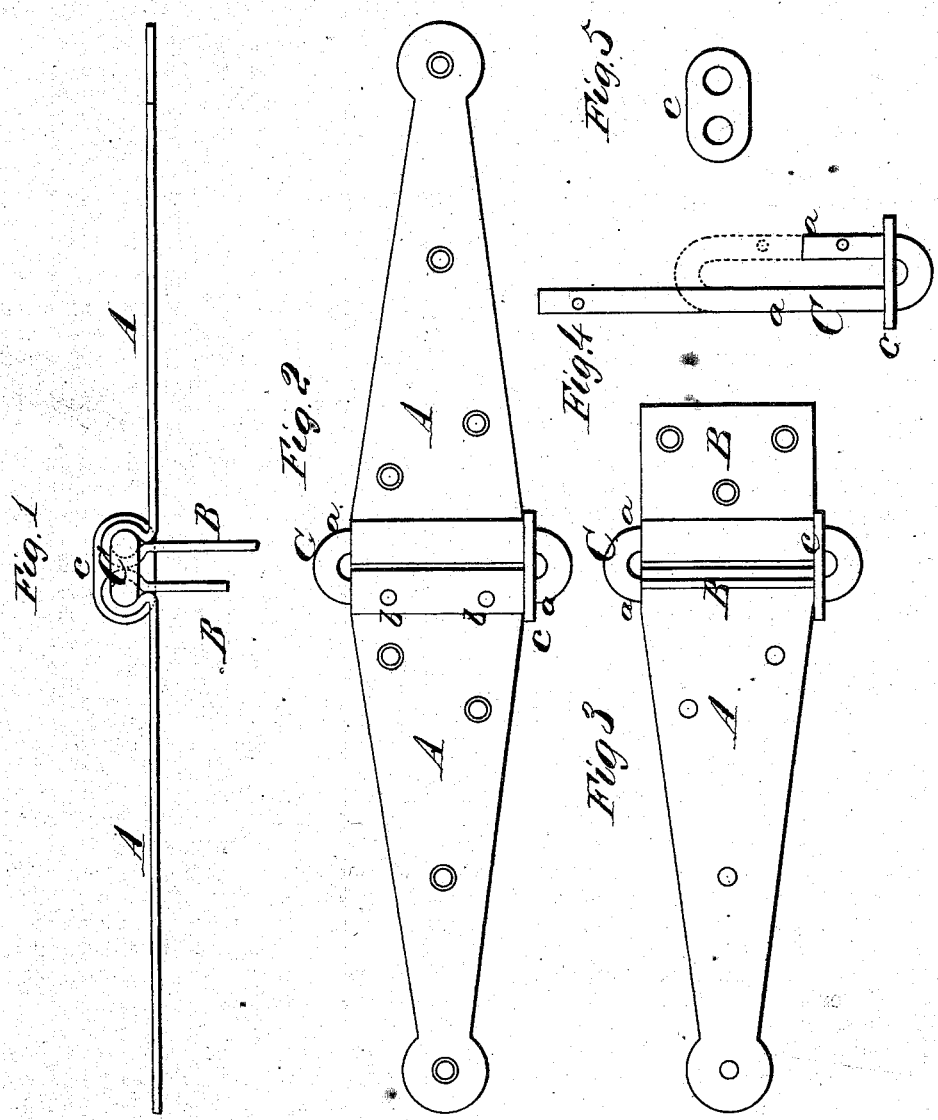
WITNESSES
E. H. Bates
Robert Everett
INVENTOR
David W. Long
Chipman, Hosmer & Co.,
ATTORNEYS

UNITED STATES PATENT OFFICE.

DAVID W. LONG, OF PARKERSBURG, WEST VIRGINIA, ASSIGNOR OF ONE-HALF HIS RIGHT TO W. N. CHANCELLOR, OF SAME PLACE.

IMPROVEMENT IN HINGES.

Specification forming part of Letters Patent No. 158,643, dated January 12, 1875; application filed October 17, 1874.

*To all whom it may concern:*

Be it known that I, DAVID W. LONG, of Parkersburg, in the county of Wood and State of West Virginia, have invented a new and valuable Improvement in Hinges; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a side view of my hinge. Figs. 2 and 3 are plan views, respectively, open and shut. Figs. 4 and 5 are detail views.

This invention has relation to sheet-metal hinges, which have rigid arms formed on the hinged ends of the leaves, which arms stand at right angles to the leaves.

The nature of my invention consists in the employment of leaves having arms or wings, and united by a link-pintle and washer, as will be hereinafter more fully described.

In the annexed drawings, A A designate the leaves of a sheet metal or strap hinge; B B, arms or wings, which are at right angles to the leaves, and very much shorter than these leaves. C designates a connecting-link united at its ends, and forming two parallel pintles, $a\ a$, around which the pieces forming the leaves and wings are bent, as shown in Fig. 1.

In practice I shall bend the metal around the link-pintles $a\ a$ in such manner that the wings B B are at right angles to their respective leaves A A, and so that when the leaves are opened, as shown in Figs. 1 and 2, the wings will touch each other. The pintle-link C is first bent, as shown in full lines, Fig. 4, its ends being perforated. It is then slipped through the eyes formed at the junctions of the leaves and wings, and bent so as to form a link, after which rivets $b\ b$ are applied through one of the eyes and through the holes in the ends of the link, thus uniting the parts rigidly and strongly together.

If the ends of the pintle-link are rounded, as shown in the drawings, I shall apply washer-bearings $c\ c$ for supporting the hinged leaves at the joint, and preventing sagging of a gate or door, to which the hinge is applied.

It will be seen from the above description the eyes of the two leaves are of the same width as the widest parts of these leaves, and that each leaf has its own pintle. I am thus able to make a much stronger joint than can be made by the old plan of cutting away portions of the eyes on the leaves and using a single pintle.

In the application for hinges now pending in the United States Patent Office, and filed March 28, 1874, I have claimed a hinge in which the portion or portions which have to be removed from the hub of one leaf, in order to make room for the hub of its fellow, are bent out instead of cut away and form a rigid arm, and I, therefore, in this application make no claim to this construction.

I claim—

The combination of the leaves A A, having arms or wings B B, and united by a link-pintle, C, and washers $c$, substantially as specified.

In testimony that I claim the above I have hereunto subscribed my name in the presence of two witnesses.

D. W. LONG.

Witnesses:
GEORGE E. UPHAM,
H. C. HOLLINGSHEAD.